25964

May 7, 1963     N. C. WILLIAMS ET AL     3,088,707

PNEUMATIC MOTOR

Filed April 19, 1962     2 Sheets-Sheet 1

INVENTORS
Norman C. Williams
Harry F. Everett

BY

AGENT

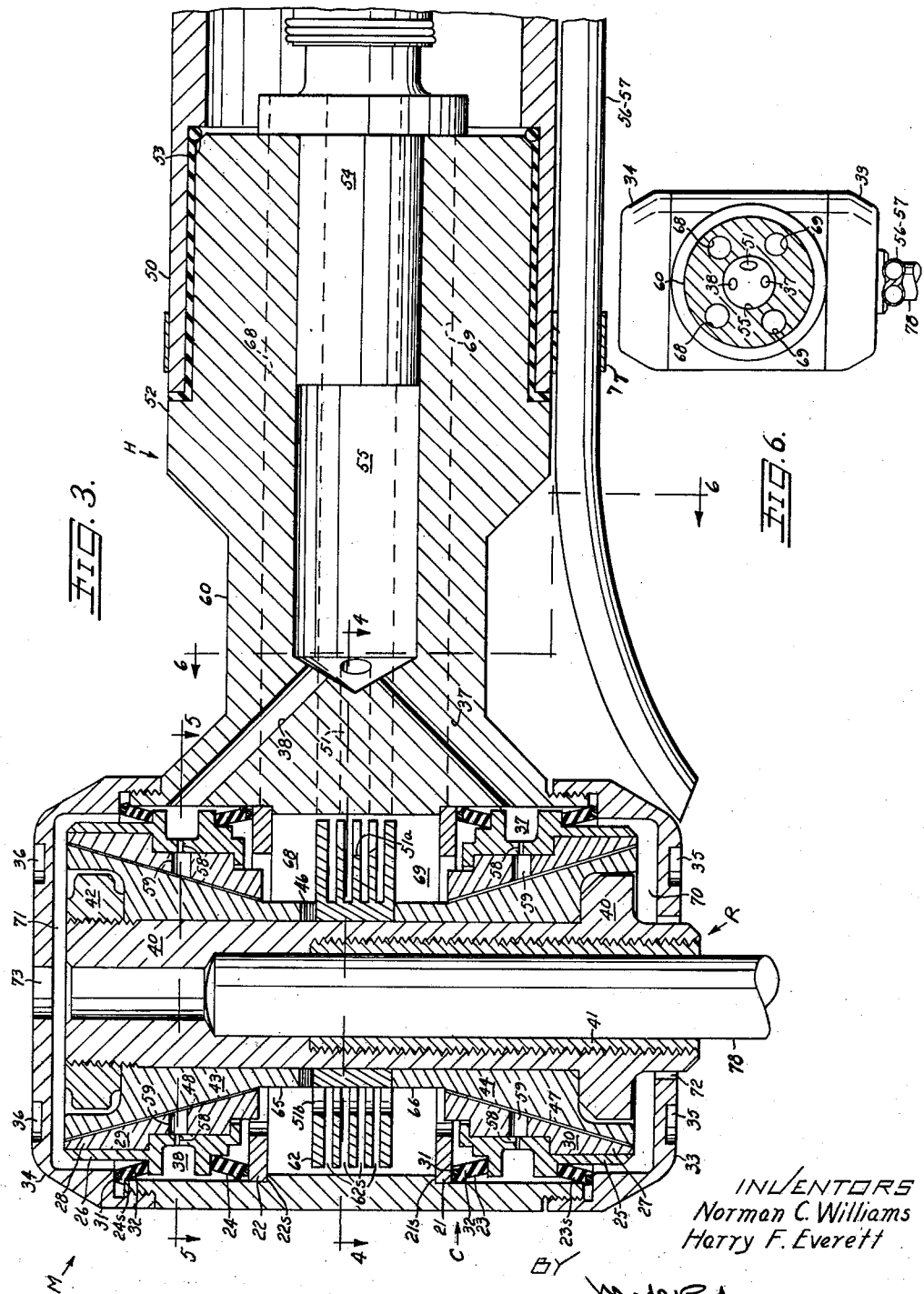

3,088,707
Patented May 7, 1963

3,088,707
PNEUMATIC MOTOR
Norman C. Williams and Harry F. Everett, Portland, Oreg., assignors to Power Brake Equipment Company, Portland, Oreg., a corporation of Oregon
Filed Apr. 19, 1962, Ser. No. 188,745
7 Claims. (Cl. 253—2)

This application is a continuation in part of U.S. patent application, S.N. 134,493, filed August 28, 1961 by the present joint inventors, Norman C. Williams and Harry F. Everett on their invention of a "Pneumatic Motor" of which this invention is an improvement.

It is a primary object of this invention to provide a pneumatic motor of high speed and small size particularly adapted to the quiet and precise operation of a dental handpiece.

It is a second object to provide such a pneumatic motor having operating elements of such simplicity that, where desired, the same motor design can be enlarged for construction of larger motors.

It is a third object to provide such a motor having a rotor with an axle on a central axis and a pneumatic turbine wheel secured coaxially on said axle at about the midlength thereof.

It is a fourth object to provide such a motor with such a rotor having a pair of axle cones secured on said axle, one near each end thereof spaced from opposite ends of said wheel and the conical surfaces of said axle cones expanding along said axle from their inner ends near said wheel.

It is a fifth object to provide such a motor with a stator having a generally cylindrical open ended casing including a handle boss formed on one side of said casing near its midlength and normal to the axis of said rotor and said casing, said boss including a high air pressure manifold formed therein and said casing including a pair of end caps removably secured over the ends thereof.

It is a sixth object to provide such a motor with such a stator having a pair of hollow conical bearings, one at each end of said stator to mate with and support said rotor on said axle cones thereof.

It is a seventh object to provide such a motor with such a stator in which each of said bearings is formed with an annular high pressure air manifold around the outside thereof and a plurality of spaced air jet holes from said manifold through said bearing to the high pressure air gap of capillary thickness between said conical stator bearing and its mating axle cone.

It is an eighth object to provide for each of said stator bearings a pair of novel and useful seal ring means resiliently to seal the outside of the stator bearing to the inside of the stator casing above and below said annular air manifold whereby said mating axle cone of said rotor will be positioned with respect to the stator bearing cone by the resilience of said seal rings, the pressure of air in said manifold and the capillary thickness of the air gap between the conical bearing and the axle cone.

It is a ninth object to provide said turbine wheel of said rotor with a plurality of spaced parallel blades normal to the axis of said rotor, said blades including a plurality of exhaust holes formed through said blades near to and parallel the axis of said wheel and a plurality of spaced notches in the periphery of said wheel to provide an improved grip on said wheel of the high pressure air ejected thereagainst.

It is a tenth object of this invention to provide in the handle boss of said casing of said motor a nozzle conduit from the high pressure air manifold of said boss to the interior of said casing directed parallel to a tangent to the surface of said wheel but below the surface thereof and to provide for each of the air pressure manifolds of each of said bearing cones a separate nozzle conduit from said manifold in said handle boss to the inner surface of said casing opening into said manifold back of said bearing cone.

How these and other objects are attained is explained in the following specification referring to the attached drawing in which FIG. 1 shows a dental handpiece, for which the pneumatic motor of this invention is particularly preferred, in side elevation and in approximately its actual size.

FIG. 3 is a fragmentary side sectional elevation as viewed along the center plane 3—3 of FIG. 2.

FIG. 6 is a vertical sectional elevation viewed from the offset plane 6—6 of FIG. 3.

Like numerals refer to like parts in the several figures of the drawing.

Figure 1:
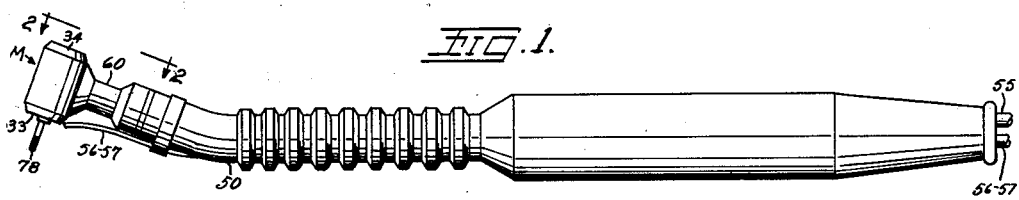
Figure 2:
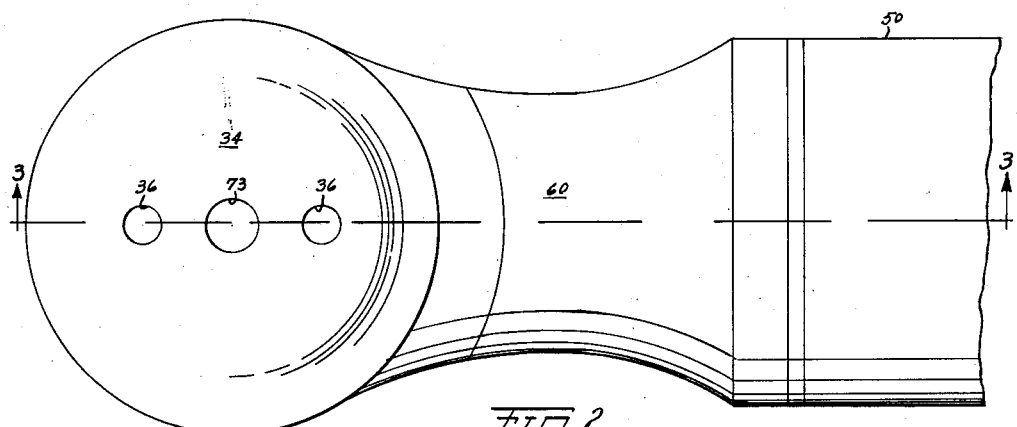
FIG. 2 shows a fragmentally enlarged annular top plan view of the handpiece as seen from the plane marked 2—2 of FIG. 1.

Referring now to the several figures of the drawing; the stator of the pneumatic motor M of this invention is seen in FIG. 3 to include a generally open ended cylindrical casing C formed with a generally cylindrical handle boss H cast on to said casing to extend therefrom about midlength of said casing and axially normal to the axis of said casing. Near each of its ends the inside diameter of casing C is increased to allow the placement therein of flat annular stop rings 21, 22. A pair of end caps 33 and 34 are threadedly secured over the respective ends of casing C. Within either end of the casing C and on end cover 33 or 34 is a hollow stator bearing cone, 27 or 28, formed to fit and be supported in a bearing ring 25 or 26 whereby either of the bearing cones 27 or 28 combined with its bearing ring 25 or 26 forms a stator bearing assembly 29 or 30.

A particular feature of this invention is the novel design and particular use of the seal rings 23, 23s, 24, 24s, each formed at its larger diameter with a metal wire 31, approximately square in section, over which a relatively stiff rubber-like material 32, is molded securely thereto to form a short cone converging axially inwardly from its wired end.

Note that in assembling a stator bearing 29 or 30, into the casing C, a stop ring 21 or 22 is first assembled into the casing C against the casing step 21s or 22s and then a real ring 23 or 24 is placed on the stop ring 21 or 22 with the metal ring end of seal ring 23 or 24 against the stop ring 21 or 22. The bearing ring assembly 29 or 30 is then placed in position on the seal ring 23 or 24 and the second seal ring 23s or 24s is placed with its softer ends against the appropriate bearing assembly 29, 30. It is seen in FIG. 3 that by applying a spanner wrench to the appropriate holes 35, 36 of cover caps 33, 34 the seal rings 23, 24 of either end bearing can be positioned not only to seal the bearing air manifold spaces 37, 38, but also to provide a desired rocking stiffness to the seal ring assemblies supporting the end bearing assemblies 24–30.

Now referring to the rotor R of the pneumatic motor M of this invention, the rotor is seen in FIG. 3 to comprise a quill bolt 40 formed with an axial hole therethrough, said hole being enlarged and threaded from its head end a greater portion of its length to receive a relatively stiff externally threaded hollow chuck 41 for a dental drill or burr 78. Since the bolt 40 has an axial hole throughout its length a drill or burr can be ejected from chuck 41 by tapping a blunt needle of small diameter into the hole against the blunt end of the drill 78. The end of quill bolt 40 opposite its head is threaded to receive a lock nut 42 for secure assembly on said bolt of a pair of oppositely tapered, axially spaced, spindle cones 43, 44, a turbine wheel 62 and a plurality of shim leaves 46 as required to position spindle cones 43, 44 of the rotor in axial spacing agreement with the bearing cones 29, 30 of the stator to avoid contact of the conical surfaces across the conical capillary spaces 47, 48 at opposite ends of the motor.

Note in FIGURES 1, 3 and 6 that there is no metallic connection between handle boss H of motor casing C and the handpiece 50 through which operating air is supplied to the mechanism. Between surface offset 52 of boss H and its end rabbet 53, boss H is heavily coated with a rubber polymer and heated to be in a mastic condition. Then the adjacent end of handpiece 50 is pushed over boss H without metallic contact therewith and the temperature of the joint is raised sufficiently for a sufficient time to polymerize the material in the joint and the joint condition will be permanently without metal to metal contact between handle boss H and handle 50. This disclosed method of suppressing the development of sonic vibration in the system is a novel and desirable feature thereof.

Note also that handle boss H of casing C is axially bored from its outer end inwardly to about the midlength of its neck, 60, and an air conduit coupling tube 54 is inserted into the bore of boss H to seal therein the high pressure air manifold 55 fed high pressure air from a source thereof through coupling tube 54 connected to conduit tube 55 entering handle 50 through its end opposite boss H.

Lower pressure air and water tubes 56 and 57 enter the inlet end of handpiece 50 and therein are connected with metallic nozzle tubes 56 and 57 after which nozzle tubes 56—57 are together brought out from the interior of handle 50 and supported thereon by band 77 free of contact with handle boss H of casing C. It is again noted that there are no metallic contacts between any parts of motor M and handle 50.

Now considering the high pressure air power supply to the improved pneumatic motor M of this invention it should first be noted that the two upper and lower stator bearing supporting high pressure air manifolds, 37 and 38, respectively, are fairly large in volume. Equally spaced around each of them are a plurality of radially inwardly projecting air jets 58, each projecting its supply of rotor supporting high pressure air from its manifold 37 or 38 through its individual expansion chamber 59 at a somewhat reduced velocity but equally increased pressure into the conical capillary gap spaces 47 or 48 separating the stator bearing cones 29, 30 from the spindle cones 43, 44 of the rotor R of motor M.

Side pressure on the end of a working drill or burr extending from the chuck 41 of the rotor R will tend to cock the axis of the rotor with respect to the axis of the stator and angular movement of the rotor cause the same angular movement of the spindle cones 43, 44 and have a tendency to take the stator bearing cones therewith. However when this tendency occurs the value of the yielding mounting of the stator bearing assemblies 29, 30 in the seal rings 23, 24 is shown for then the seal rings 23, 24 allow the bearing assemblies to move either laterally or longitudinally the infinitesimal amount required to recenter the bearing journals of the rotor on the axis of the stator bearing assemblies there will be no solid material contact either laterally or longitudinally of stationary to rotary parts.

Figure 4:
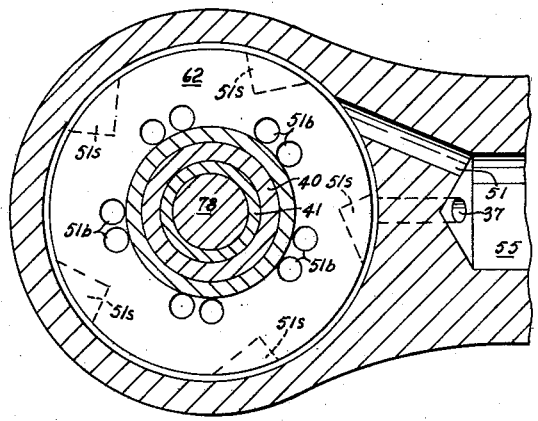
FIG. 4 is a fragmentary plan section as seen downwardly from the plane 4—4 of FIG. 3.
Figure 5:
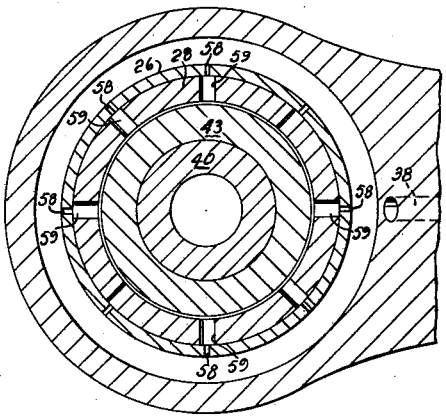
FIG. 5 is a fragmentary plan section as seen downwardly from the the plane 5—5 of FIG. 3.

Continuing with respect to the rotor R of the motor M as seen in FIGURES 3 and 4, the rotor axle or headed quill bolt 40 is internally threaded from its head end to receive the externally threaded non metallic chuck 41 for a dental drill or burr 78, not shown. Bolt 41 is externally threaded at its other end to receive lock nut 42 for the purpose of axially securing on said bolt the turbine wheel 62 of rotor R and upper and lower spindle cones 43, 44 of said rotor. Each of said cones have cylindrical extensions 65 or 66 at their inner ends which together with variable stack of shim leaves 46 are used to space rotor bearing journals 43, 44 from wheel 62 to form exhaust air spaces 68, 69 and also to space rotor bearing journals 43, 44 from stator bearing assemblies 29, 30, to determine the conical capillary spaces 47, 48 between the rotor bearing journals 43, 44 and the conical stator bearing assemblies 29, 30. It is seen that the high pressure bearing supporting air from manifold 55 in handle boss H of casing C discharges air through conduits 37, 38 to stator manifolds 37, 38 and then to capillary spaces 47, 48 through jets 58 and quieting spaces 59 and must discharge to atmosphere through the large diameter ends of spaces 47, 48 into the spaces 70, 71 under the stator end caps 33 and 34 and out to atmosphere through holes 72, 73 in the end caps and through the small diameter ends of spaces 47, 48 into the exhaust spaces 68, 69 from where this low pressure exhaust air is exhausted to the interior of handle 50 through conduits 68, 69. The exhaust air from spaces 68, 69 and conduits 68, 69 to the interior of handle 50 can be exhausted from handle 50 directly to atmosphere or can be taken farther away with an exhaust hose, not shown.

Referring now to the improved turbine wheel 62 as seen in FIGURES 3 and 4 where the scale is approximately 6 to 8 times size, the wheel is made of a circular disk of stainless steel less than one-eighth inch thick and less than three-eighths inch in outside diameter. The inside diameter of wheel 62 is a neat fit over the outside of bolt 40. Centered in plane 4—4 of FIG. 3 and angled like the conduit 51 shown in FIG. 4, the five spaced notches 51s are next bored with a circular tool into the edge of block 62 as shown at 51a in FIG. 3. Next five pairs of holes 51b, spaced as shown in FIG. 4 are drilled through block 62 substantially tangent to the circular extension 65, 66 of spindle cones 43, 44 in the axial directions thereof. And, finally, a plurality of parallel capillary slots 62s are sawed into block 62 from its outer perimeter to the inner edges of holes 51b.

This construction of turbine wheel 62 is an effective improvement in the pneumatic motor of this invention since the high pressure air through nozzle conduit 51 from manifold 55 strikes into the periphery of wheel 62 in the direction normal to the shorter sides of spaced notches 51s whereby a greater amount of active air is pressured into capillary slots 62s on its way through the slots and upwardly or downwardly out the exhaust holes 51b to exhaust spaces 68, 69 to escape therefrom by conduits 68, 69 to the outer interior of handle 50. Note also that by the direction of air driven into slots 51s from nozzle conduit 51 additional work is obtained from the air because of its high speed direction of tangency to the exhaust holes 51b and the delay of the air in getting to the exhaust holes 51b.

Having here recited some of the principal objects of our invention, illustrated and described a preferred way in which our invention may be practiced, and described its operation, we claim:

1. A dental handpiece for driving a dental drill at high speed, said handpiece having a stationary casing, a rotor including an axle supported coaxially in said casing, a compressed air driven turbine wheel secured coaxially on said axle for driving said rotor, a pair of outwardly facing oppositely conical rotor bearing journals secured on said axle at its opposite ends, a pair of inwardly facing oppositely conical stator bearing assemblies each including a supporting ring surrounding one of said stator bearings on its outer side to make up said assemblies, each of said supporting rings having a groove sunk circumferentially therearound adjacent to the inner face of said casing, said casing including on either axial side of each of said grooves a pair of identical conical resilient seal rings for sealing and supporting said conical stator bearing assemblies resiliently on the inner face of said casing to provide an inlet manifold for compressed air, each of said inner faced conical stator bearing assemblies including conduit means for connecting its said groove with the conical air gap between said inner faced conical stator bearing assembly and its mating outwardly facing rotor bearing journal.

2. The dental handpiece of claim 1 in which said rotor extends substantially the length of said casing, said turbine wheel is secured at substantially the mid-length of said axle, and said rotor bearing journals comprise conical surfaces axially spaced from opposite sides of said wheel and radially increasing toward the ends of said axles.

3. The dental handpiece of claim 1 in which said casing includes a nozzle conduit formed therein for supplying compressed air substantially tangentially to said wheel in a plane normal to the axle thereof.

4. The dental handpiece of claim 3 in which said turbine wheel comprises a disc having a plurality of axially spaced circumferential capillary slots, a plurality of uniformly circumferentially spaced axially extending notches, and a plurality of axial exhaust holes near the axis of said disc and providing communication between said slots and a pair of exhaust spaces disposed between said wheel and said stator bearing assemblies, and said stationary casing having a plurality of exhaust conduits leading from said exhaust spaces to the atmosphere.

5. A pneumatic motor comprising a stator and a rotor, said stator including a generally cylindrical open ended casing, a handle boss secured to one side of said casing, a pair of end caps axially adjustably secured over the respective ends of said casing, said boss including means forming a first space for receiving and storing high pressure pneumatic fluid, said motor including a source of said fluid under pressure, said rotor including an axle concentric with said casing and about the length of said casing with its end caps, said axle including a pneumatic turbine wheel secured coaxially thereon at about its mid-length, said axle including, near its ends and spaced from the opposite faces of said wheel, a pair of conical journals axially adjustably secured on said axle with the conical outer surfaces thereof starting near said wheel and expanding therefrom toward the ends of said axle, said casing including a nozzle conduit formed therein for receiving said pneumatic fluid from said first space, and discharging said pneumatic fluid received from said first space through said nozzle conduit against the surface of said wheel in a vertical angular direction substantially normal to said wheel and in a horizontally angular direction substantially within a line of tangency to the circumference of said wheel, said stator including, one near each end of said casing, a pair of hollow inwardly facing conical stator bearings together with a supporting ring for each of said stator bearings to form therewith a pair of conical stator bearing assemblies, each of said assemblies on its outer circumferential face near the inner face of said casing having sunk therearound a circumferential groove and said stator including on opposite sides of each of said grooves a pair of substantially identical resilient seal rings for sealing said one of said conical stator bearing assemblies on either side of said groove to the inner face of said casing, thereby to form with said grooved assemblies, said casing and said pairs of resilient rings, respective second and third spaces for high pressure pneumatic fluid.

6. The pneumatic motor of claim 5 in which said casing includes second and third high pressure pneumatic fluid conduits connecting said first space for high pressure pneumatic fluid with said grooves in said conical stator bearing assemblies to form thereby inlet manifolds of said grooves and each of said grooves in said bearing assemblies is formed with a plurality of circumferentially spaced radial jet means each discharging high pressure pneumatic fluid through one of a plurality of high pressure fluid expanding spaces formed through the adjacent conical stator bearing assembly into one of said gaps for high pressure pneumatic fluid between the opposing faces of said rotor bearing journals and the inner faces of said stator bearing assemblies to support said rotor axle journals on the high pressure pneumatic fluid between said rotor journals and said stator bearing assemblies.

7. The pneumatic motor of claim 5 in which said pair of seal rings are substantially conical but approximately rhomboidal in section with the larger diameter thereof against the inner diameter of said stator casing and reinforced at its larger diameter of said section with a continuous metal ring small and approximately square in section to prevent deformation of said seal ring as it is held in place between said stator bearing assembly and an inner face of said casing, the remaining inwardly converging axial length of said seal ring being formed of a rubber-like relatively rigid material to maintain a seal against the outside surface of said grooved supporting ring of said stator bearing assembly and give said supporting ring a sealing strut support stress between said casing and said stator bearing assembly, whereby said stator bearing assembly can yieldingly resist any eccentric movement of said high pressure air supported rotor axle to maintain said axle in its concentric position.

References Cited in the file of this patent

UNITED STATES PATENTS

| | | |
|---|---|---|
| 1,047,898 | Scott | Dec. 17, 1912 |
| 2,602,632 | Serduke et al. | July 8, 1952 |

FOREIGN PATENTS

| | | |
|---|---|---|
| 1,236,409 | France | June 7, 1960 |
| 847,331 | Great Britain | Sept. 7, 1960 |
| 1,099,693 | Germany | Feb. 16, 1961 |
| 354,893 | Switzerland | July 31, 1961 |